(12) United States Patent
Protsch et al.

(10) Patent No.: US 7,331,498 B2
(45) Date of Patent: Feb. 19, 2008

(54) METHOD FOR REFINING AND HOMOGENEOUSLY DISTRIBUTING ALLOYING PARTNERS AND FOR REMOVING UNDESIRABLE REACTION PRODUCTS AND SLAGS IN OR FROM SOFT SOLDER DURING THE PRODUCTION OF FINE SOLDER POWDER

(75) Inventors: Walter Protsch, Teltow (DE); Juergen Schulze, Potsdam (DE)

(73) Assignee: W. C. Heraeus GmbH, Hanau (DE)

( * ) Notice: Subject to any disclaimer, the term of this patent is extended or adjusted under 35 U.S.C. 154(b) by 0 days.

(21) Appl. No.: 11/193,758

(22) Filed: Jul. 28, 2005

(65) Prior Publication Data

US 2006/0208042 A1    Sep. 21, 2006

(30) Foreign Application Priority Data

Aug. 3, 2004    (DE) .................. 10 2004 038 280

(51) Int. Cl.
*B23K 35/04* (2006.01)
*B22F 9/06* (2006.01)

(52) U.S. Cl. .............. 228/56.1; 228/34; 228/56.3; 228/246; 75/335; 75/340

(58) Field of Classification Search ........... 228/260, 228/56.1; 75/335, 340
See application file for complete search history.

(56) References Cited

U.S. PATENT DOCUMENTS 5,411,602 A    5/1995    Hayes
6,231,691 B1    5/2001    Anderson et al.
6,290,745 B1 *    9/2001    Schulze et al. ............... 75/335
6,485,674 B2 *    11/2002    Schulze et al. ............. 266/202
2002/0051728 A1 *    5/2002    Sato et al. .................. 420/562
2002/0109273 A1 *    8/2002    Schulze et al. ............. 266/186

FOREIGN PATENT DOCUMENTS

| DE | 198 30 057 | | 3/2000 |
| JP | 02-118003 A | * | 5/1990 |
| WO | WO-03/051572 | | 6/2003 |

OTHER PUBLICATIONS

EPO machine translation for WO 03/051572A1.*

* cited by examiner

*Primary Examiner*—Kiley Stoner
(74) *Attorney, Agent, or Firm*—Jordan and Hamburg LLP (57) ABSTRACT

Method for refining and homogeneously distributing alloying partners and for removing undesired reaction products such as oxides and/or slag in or from soft solder during the production of fine solder powder, in which the solder alloy is melted in a high temperature-resistant plant and/or animal oil, the melt is moved to another container of oil with a temperature of at least 20° C. greater than the liquidus temperature, stirred there, and subjected to multiple shear treatments using rotors and stators for forming a dispersion comprising solder balls and oil, from which dispersion the solder balls are separated by means of subsequent sedimentation.

12 Claims, 10 Drawing Sheets

Nd

PRIOR ART

PRIOR ART

PRIOR ART

PRIOR ART

METHOD FOR REFINING AND HOMOGENEOUSLY DISTRIBUTING ALLOYING PARTNERS AND FOR REMOVING UNDESIRABLE REACTION PRODUCTS AND SLAGS IN OR FROM SOFT SOLDER DURING THE PRODUCTION OF FINE SOLDER POWDER

BACKGROUND OF THE INVENTION

The invention relates to a method for refining and homogeneously distributing alloying partners and for removing undesired reaction products such as oxides and/or slag in or from soft solder during the production of fine solder powder.

Known from WO 03/051,572 is a lead-free soft solder based on a tin/silver/copper solder alloy in which 0.8 to 1.2 wt. % indium and 0.01 to 0.2 wt. % of an element of the lanthanoids such as for instance lanthanum or neodymium are always alloyed to a base alloy with 5 to 20 wt. % silver, 0.8 to 1.2 wt. % copper, the rest tin and normal impurities.

Beginning at 214° C., this known lead-free soft solder behaves eutectically, suppresses the development of large tin dendrites, ensures a smooth and homogeneous surface after melting, and also has good physical and chemical properties such as for instance very good wettability, high endurance limit under reversed stress, good corrosion resistance, plasticity, and strength, and also a slight electrical resistance.

However, the melting of the alloy and also the processing of this known alloy into fine solder balls leads, in particular due to the very high reactivity of the alloy components lanthanum and neodymium, to serious problems that are exhibited in an agglomeration of reaction products of the neodymium or lanthanum in the solder balls. Neodymium reacts extremely vigorously, for instance even with bound residual oxygen in the melt that is always present in traces, and forms oxides that also agglomerate in the solder balls to larger formations. These oxides accumulate a relatively large amount of neodymium, which is then missing in the matrix or grain boundaries. Furthermore, intermetallic phases with the composition $Ag_3Sn$ and $Cu_6Sn_5$ occur.

The processability and electrical properties of such soft solders are permanently limited by these hard occlusions.

Known from DE 19 830 057 C2 is also a method for producing without pressure soft solder powder in a grain size from 1 to 100 µm, in which the metallic solder is melted in a high temperature-resistant vegetable or animal oil, then stirred and dispersed in multiple shear treatments by rotors and stators into solder balls of defined size.

In accordance with U.S. Pat. No. 5,411,602 A, solder is melted and the melted solder is divided into drops by means of inert gas. Despite the inert gas atmosphere, it is not possible to prevent reactive metals such as neodymium or lanthanum from reacting with bound oxygen so that the solder alloy contains more or less oxides of these metals and the doping for instance with neodymium or lanthanum is more or less lost.

U.S. Pat. No. 6,231,691 B1 describes a lead-free solder alloy with a tin base with 4.7 wt. % silver, 1.7 wt. % copper, and 0.15 wt. % nickel. This known alloy tends toward increased formation of intermetallic phases of the $Cu_3Sn$ and/or $Cu_6Sn_5$ type, which have very negative effects on the mechanical/physical properties of the soldering joint.

BRIEF SUMMARY OF THE INVENTION

Given this prior art, the object of the invention is to prevent with certainty the reaction of the reactive alloying partners with oxygen, nitrogen, and other reaction partners when processing lead-free soft solder alloys into fine solder powders, to avoid agglomeration of the reaction products in the matrix of the solder balls, and to distribute the alloying partners finely dispersed and homogeneously in the matrix of the solder balls. The invention includes a method for refining and homogeneously distributing alloying partners and for removing undesired reaction products such as oxides and/or slag in or from soft solder during the production of fine solder powder, in which the solder alloy is melted in a high temperature-resistant vegetable and/or animal oil (i.e., resistant to temperatures to which it is exposed), the melt is moved to another container of oil with a temperature of at least 20° C. greater than the liquidus temperature, stirred there, and subjected to multiple shear treatments using rotors and stators for forming a dispersion comprising solder balls and oil, from which dispersion the solder balls are separated by means of subsequent sedimentation.

This object is attained using a method of the type cited in the foregoing with the features of the present description.

For example, a first aspect of the invention involves a method for refining and homogeneously distributing alloying partners and for removing undesired reaction products such as oxides and/or slag in or from soft solders during the production of fine solder powder comprising: melting a solder alloy in an oil in a first container to form a melt, wherein the oil acts as a separating medium to separate the soft solder and the reaction products and/or slag by a release of the reaction products and/or slag into the oil when the solder is melted into a melt, and wherein the reaction products and/or slag build up in the oil away from the melt due to differences in density between the melt and the reaction products and/or slag; moving the melt to a second container having an oil with a temperature of at least 20° C. greater than a liquidus temperature of the melt; suctioning of the oil with the reaction products and/or slag from the first container; stirring the melt in the second container and subjecting the melt in the second container to multiple shear treatments using rotors and stators at a circumferential rotor speed of 15.0 to 25 m/s while maintaining a melt-to-oil volume ratio of 1:20 to 1:50 for forming a dispersion comprising solder balls and oil, the shear treatments enlarging a surface area of the solder melt and driving out the reaction products and/or slag, wherein the reaction products and/or slag build up in the oil in the second container away from the melt due to differences in density between the melt and the reaction products and/or slag; subjecting the solder melt to turbulent mixing during a cycle period of 10 to 30 minutes for homogeneous distribution of the alloying partners in the solder; separating solder balls from the dispersion by sedimentation; and separating the built-up reaction products and/or slag together with the oil away from the solder balls after the solder balls have settled.

A second aspect of the invention is a method for refining and homogeneously distributing alloying partners in soft solder comprising processing the soft solder with oil to produce fine solder powder between 2.5 and 45 µm in diameter where the oil comprises animal and/or vegetable oil such as castor oil.

A third aspect of the invention is a method of separating reaction products including oxides and/or slag from soft solder comprising processing the soft solder with oil for producing fine solder powder between 2.5 and 45 µm in diameter where the oil comprises animal and/or vegetable plant oil such as castor oil.

Advantageous embodiments of the method can also be found in the present description.

For example, a fourth aspect of the invention is a method according to the first aspect of the invention (see above) wherein the soft solders substantially comprise Sn, Ag, Cu, In, and a lanthanoid and/or a reaction product of a lanthanoid.

A fifth aspect of the invention is a method according to the first aspect of the invention (see above) wherein the soft solders substantially comprise Sn, Ag, Cu, In, Nd, and reaction products in a form of neodymium oxide and/or $Ag_3Sn$- and $Cu_6Sn_5$-intermetallic phases.

A sixth aspect of the invention is a method according to the first aspect of the invention (see above), wherein the soft solders substantially comprise Sn, Ag, Cu, Ni and $Cu_3Sn$- and/or $Cu_6Sn_5$-intermetallic phases A seventh aspect of the invention is a method according to the first aspect of the invention (see above), wherein the soft solders substantially comprise Sn, Ag, and reaction products in a form of $Ag_3Sn$-intermetallic phases.

An eighth aspect of the invention is a method according to the first aspect of the invention (see above), wherein the soft solders substantially comprise Sn, Cu, and reaction products in a form of $Cu_3Sn$- and/or $Cu_6Sn_5$-intermetallic phases.

A ninth aspect of the invention is a method according to the first aspect of the invention (see above), wherein fine solder powder with a diameter between 2.5 and 45 µm is produced.

A tenth aspect of the invention is a method according to the first aspect of the invention (see above), wherein a surface area of the solder melt is enlarged 2000 to 4000 times by the shearing.

An eleventh aspect of the invention is a method according to the first aspect of the invention (see above), wherein the oil in the first container and in the second container comprises animal and/or vegetable oil.

A twelfth aspect of the invention is a method according to the first aspect of the invention (see above), wherein castor oil is employed as the separating oil in the first container and in the second container.

The inventive solution is distinguished in that the oil used for melting the solder represents both an inert medium relative to the alloying partners, for instance lanthanum or neodymium, in soft solder alloys and a separating medium for removing the reaction products, such as oxides and/or slag, that are contained in the solder alloy.

The inventive method furthermore permits the alloying partners in the solder alloy to be refined to some extent and to be distributed homogeneously and finely dispersed in the alloy. The complex problems involved with these procedures shall be elucidated in that the sheared solder balls themselves have dimensions that very nearly approach those of the structure of the elements.

By removing the disadvantageous slag and the oxide occlusions of the lanthanoids or other reactive metals that are formed with the melting process or processing of these solders for producing fine solder powder, it is possible to provide a fine solder powder that satisfies all demands for microcontacting.

Additional advantages and details result from the following description with respect to the attached drawings.

The invention shall be explained in greater detail in the following using an exemplary embodiment.

Fine solder balls of the lead-free alloy SnAg5Cu1In1Nd0.2 with a diameter of 5 to 15 µm (type 6) are to be produced using the inventive method.

DETAILED DESCRIPTION

Figure 1:
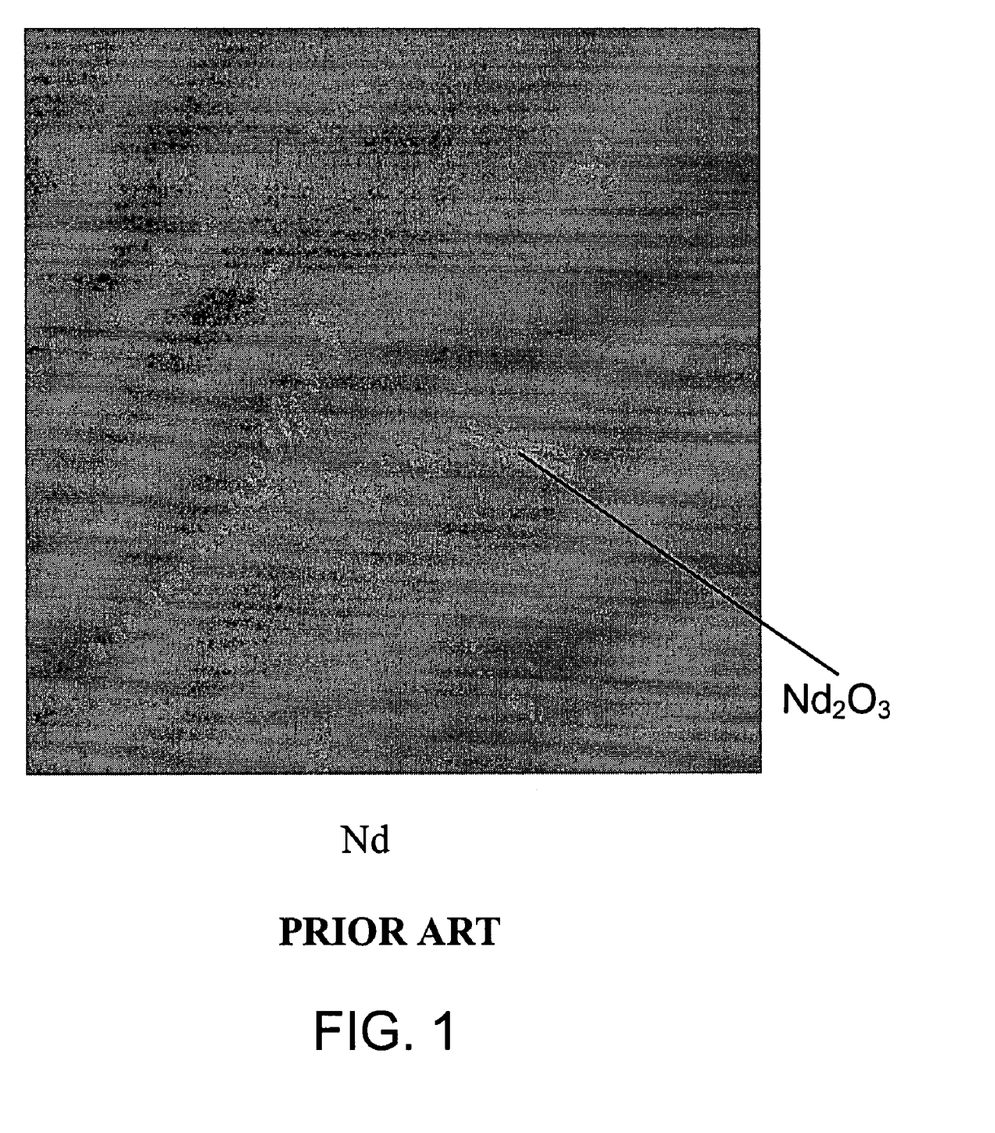
FIG. 1 is a REM image (mapping) of a lead-free solder alloy with neodymium oxide occlusions in accordance with the prior art.
Figure 2:
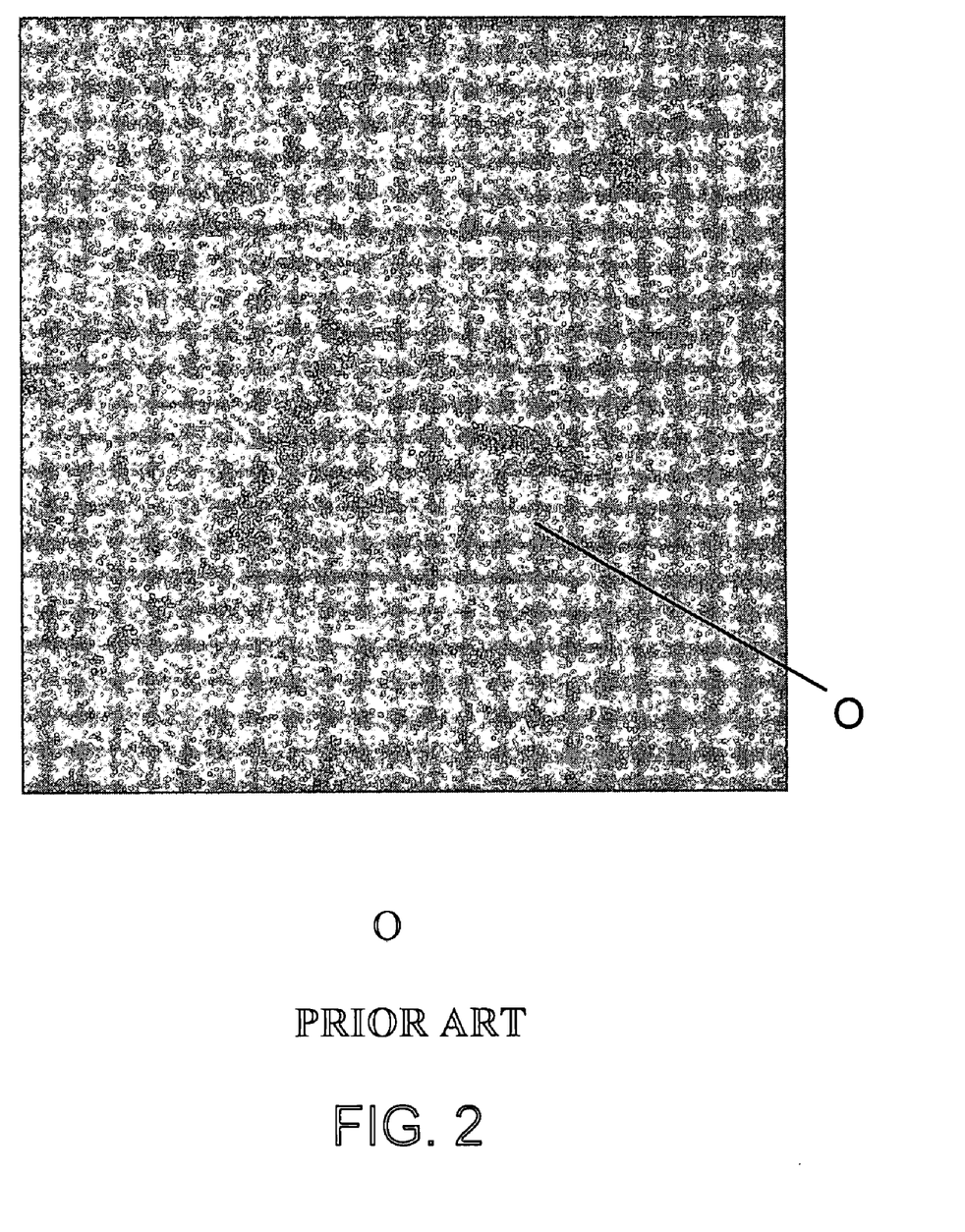
FIG. 2 is a REM image (mapping) with oxygen distribution in accordance with FIG. 1.
Figure 3A:
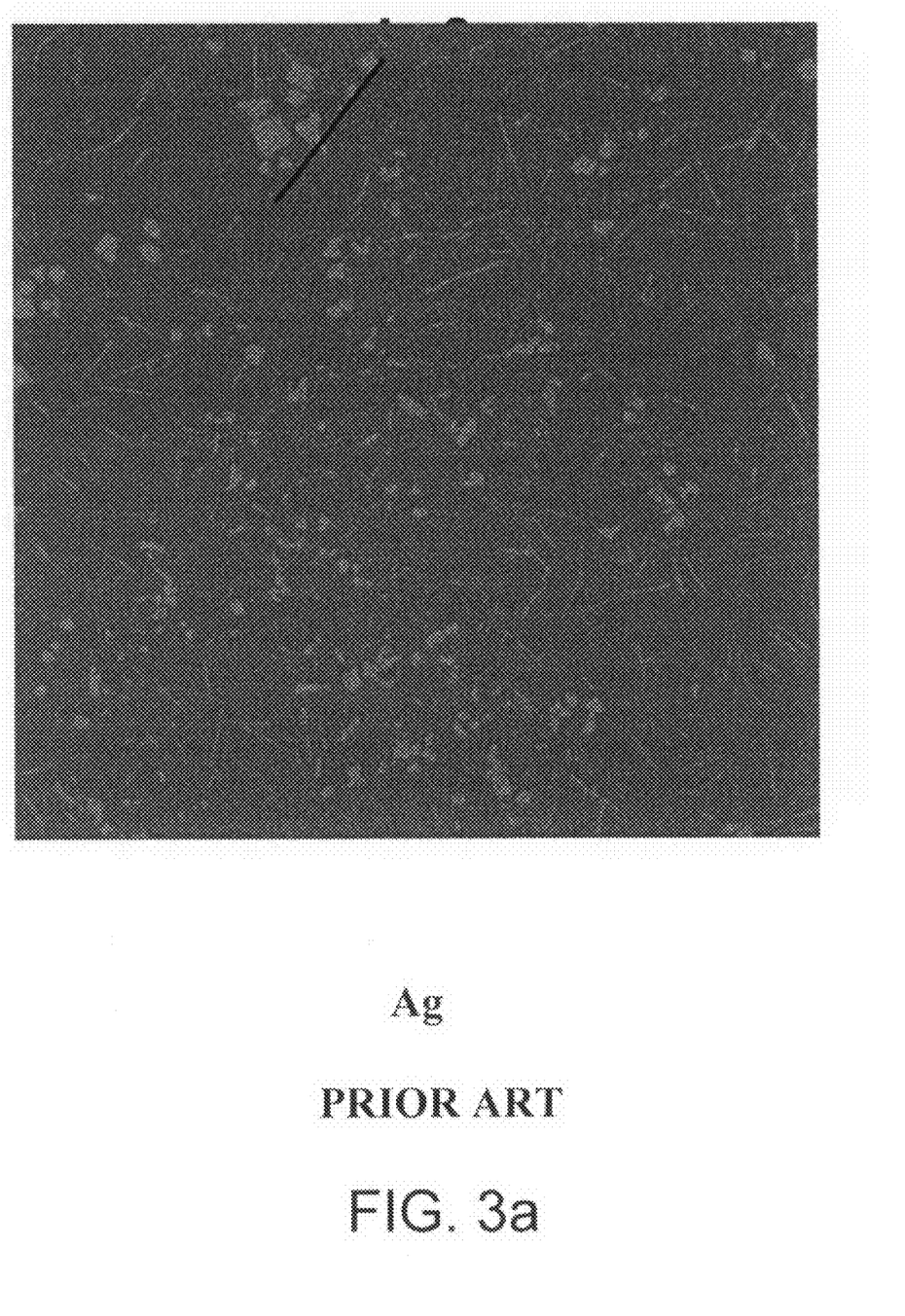
FIGS. 3a and b are REM images of a lead-free solder alloy with intermetallic phases with the composition $Ag_3Sn$ and $Cu_6Sn_5$ in accordance with FIG. 1.
Figure 3B:
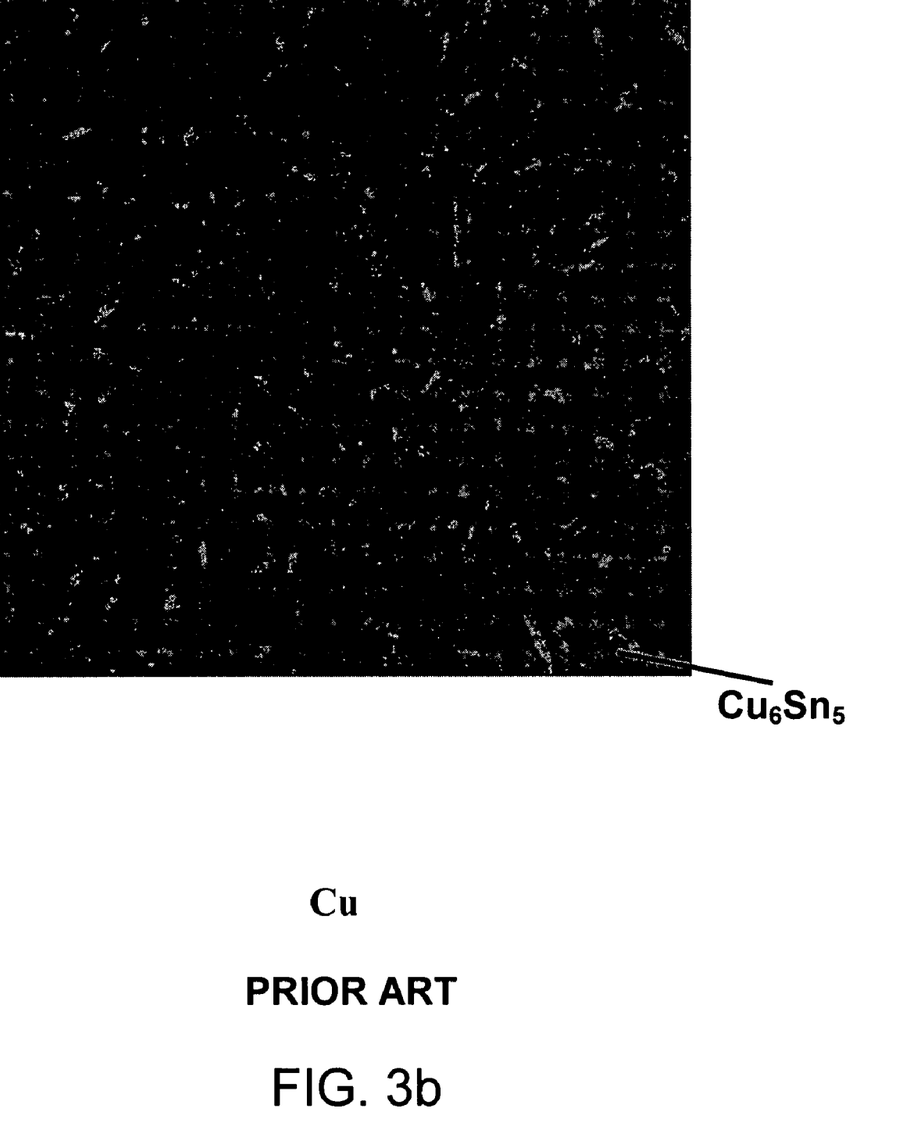

FIGS. 1, 2, 3a, and 3b illustrate the initial status of the lead-free solder alloy in accordance with the prior art and in which the occlusions of neodymium oxide (FIG. 1) and the intermetallic phases $Ag_3Sn$ and $Cu_6Sn$ (FIGS. 3a and 3b) can be seen very clearly. FIG. 2 illustrates the distribution of the oxygen in the alloy, which proves that the occlusions are oxides ($Nd_2O_3$).

The oxide occlusions have a melting point of 2,272° C., a density of 7.29 g/cm³, and are hard, not ductile, and brittle. In addition, the oxide accumulates a relatively large amount of elementary neodymium, so that it lacks grain boundaries, the resistance to cyclic temperature stress of the soldering joint being negatively influenced by tears and rapid crack propagation.

The occlusions in the soldering joint then lead to interruptions and irregularities in the electrical properties so that such solder is no longer particularly well suited for microcontacting.

FIGS. 4a through 4f illustrate the distribution of the alloying partners tin, silver, copper, indium, and neodymium of a lead-free soft solder alloy in a solder ball that was produced in accordance with the inventive method.

For this, 12 kg of the lead-free solder alloy SnAg5Cu1In1Nd0.2 is added as pig or bar to a melting container filled with 3 liters of castor oil and the oil is heated to at least 20° C. greater than the liquidus temperature of the solder alloy, for instance 240° C., to melt the solder alloy. The oil behaves anaerobically relative to the solder and completely closes the solder melt off from the atmosphere. The neodymium oxides are released from the solder melt during the melting process. Due to their lower density relative to the melt, they drive upward in the oil and build up there within 2 hours until reaching the process temperature of the system. The oil thus functions not only as a heat carrier and dispersion agent, but also as a separating agent.

The remaining solder melt is drained through a nozzle system into another container with castor oil and thus separated from the separated impurities. The temperature of this oil is also at least 20° C. greater than the liquidus temperature of the solder alloy. The solder melt travels into a dispersion reactor in which the solder melt is subjected to a shear treatment using rotors passing stators at a circumferential speed of 23 m/s so that the solder melt is separated into small solder balls, this causing 2500-fold surface enlargement of the melt and releasing formerly occluded impurities. The separated solder balls, together with the oil, are put through the cycle in the dispersion reactor multiple times, i.e. at least 20 times, until the desired diameter distribution for the solder balls is attained and at the same time the rest of the impurities have been driven out of the solder melt. During dispersion of the solder, work is performed with a solder-to-oil volume ratio of 1:20 to 1:50 and a dispersion time of 16 minutes.

Once this time has elapsed, the disperse solder ball/oil mixture is added to a settling container, where the sheared solder balls harden and settle in the oil. The impurities that precipitated during the dispersion collect in the oil due to their density, which is lower than that of the solder. Oil and impurities are suctioned off and thus separated from the solder balls.

Figure 4A:
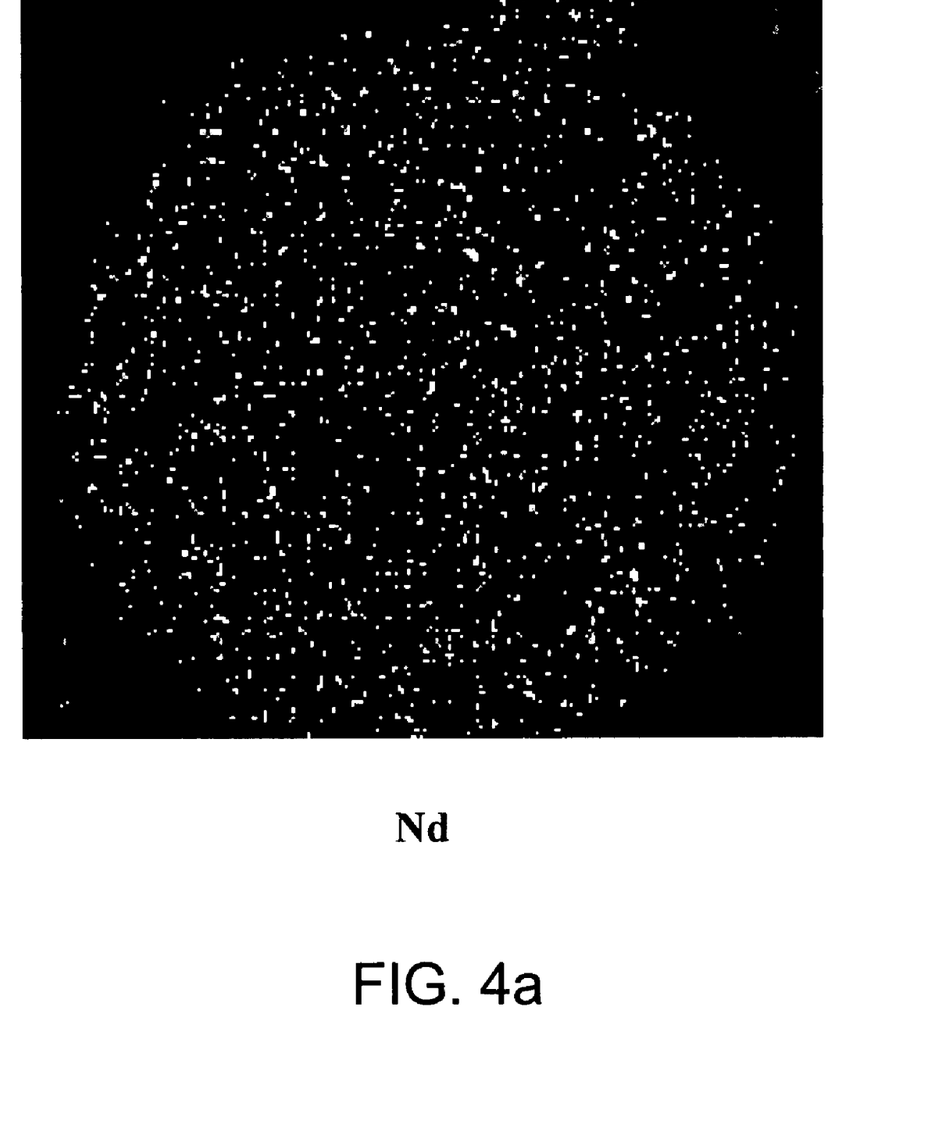
FIGS. 4a through f are REM images of a solder ball in accordance with the invention with distribution of the alloy components (silver, tin, copper, indium, neodymium, and oxygen) in the solder ball.
Figure 4B:
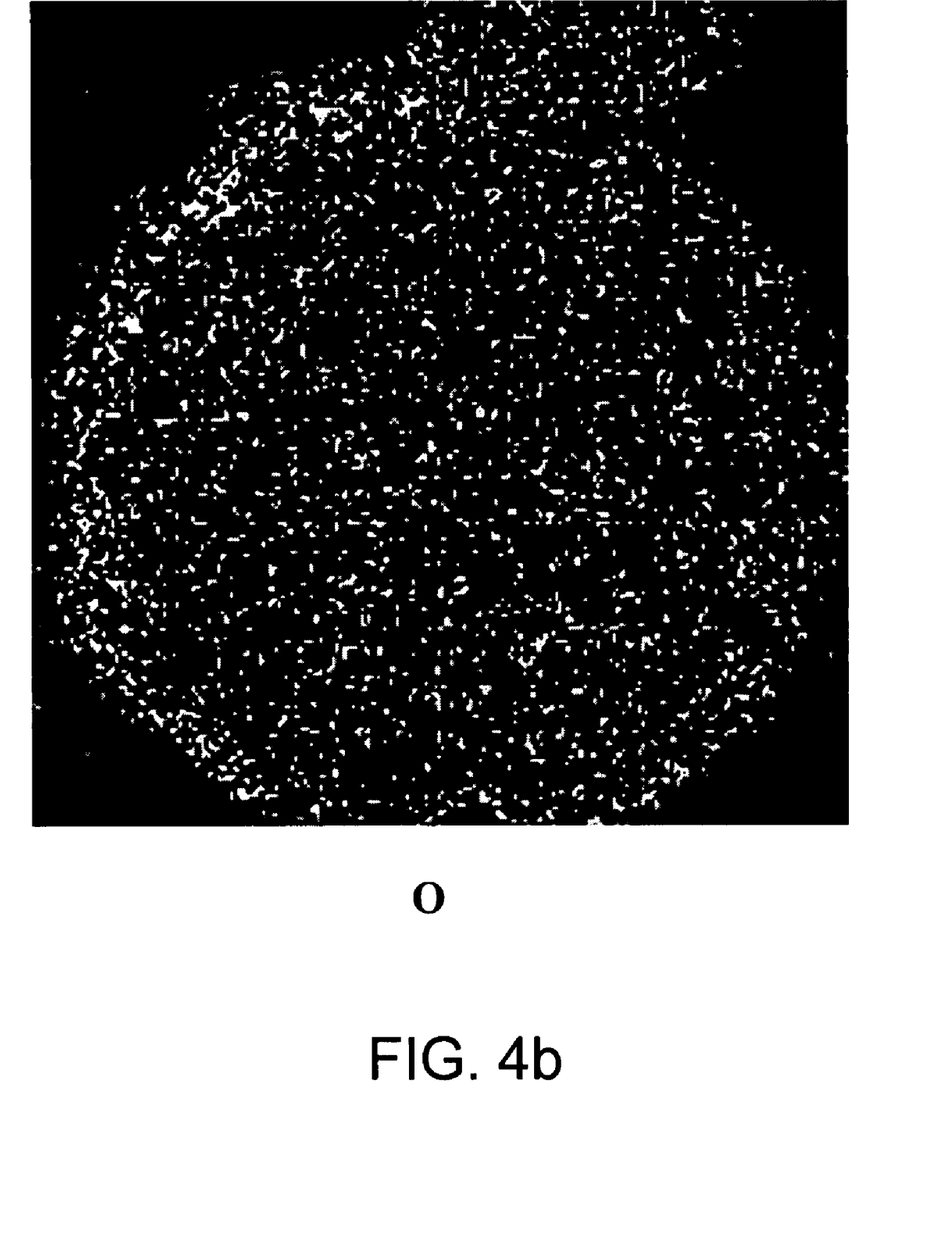
Figure 4C:
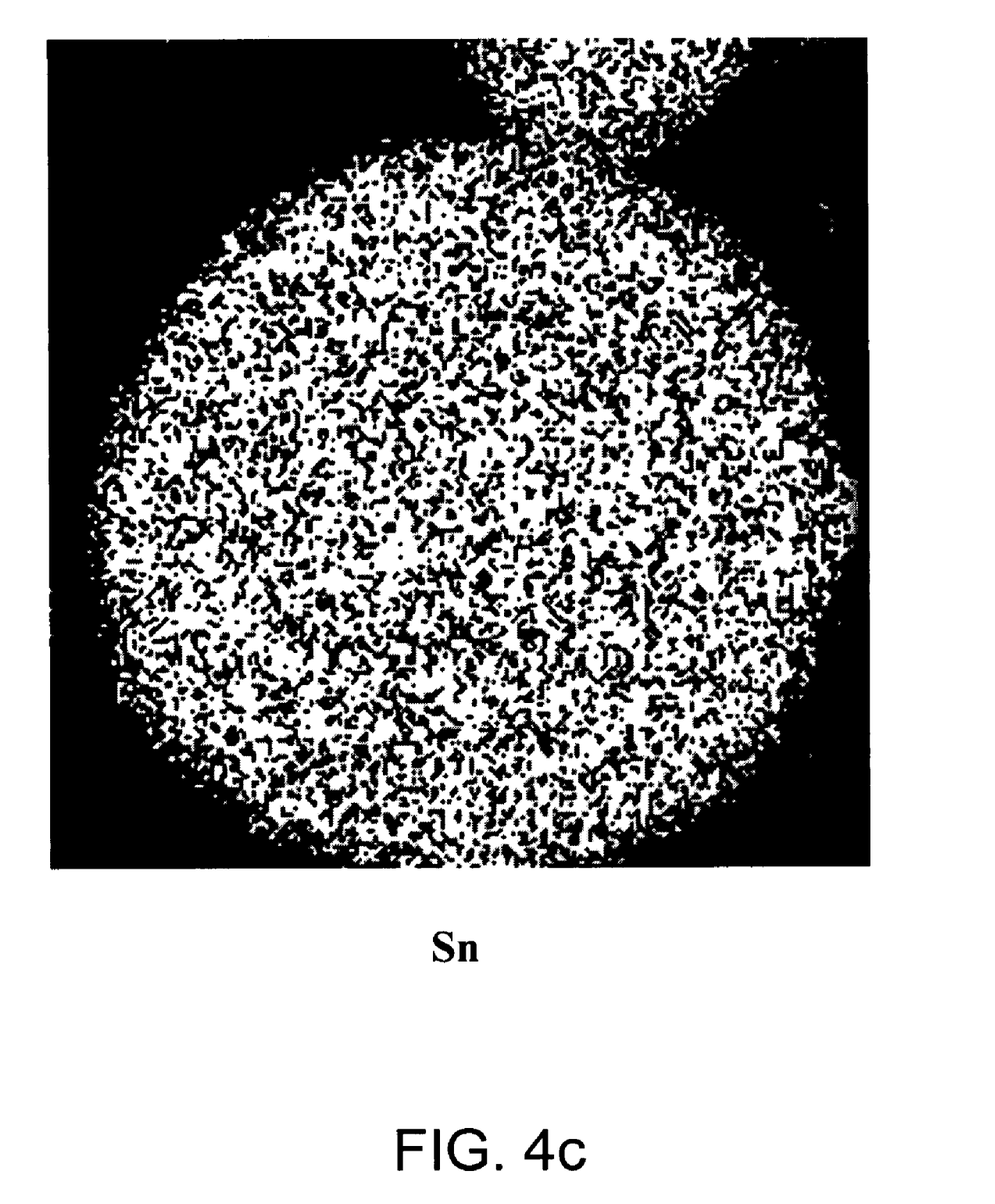
Figure 4D:
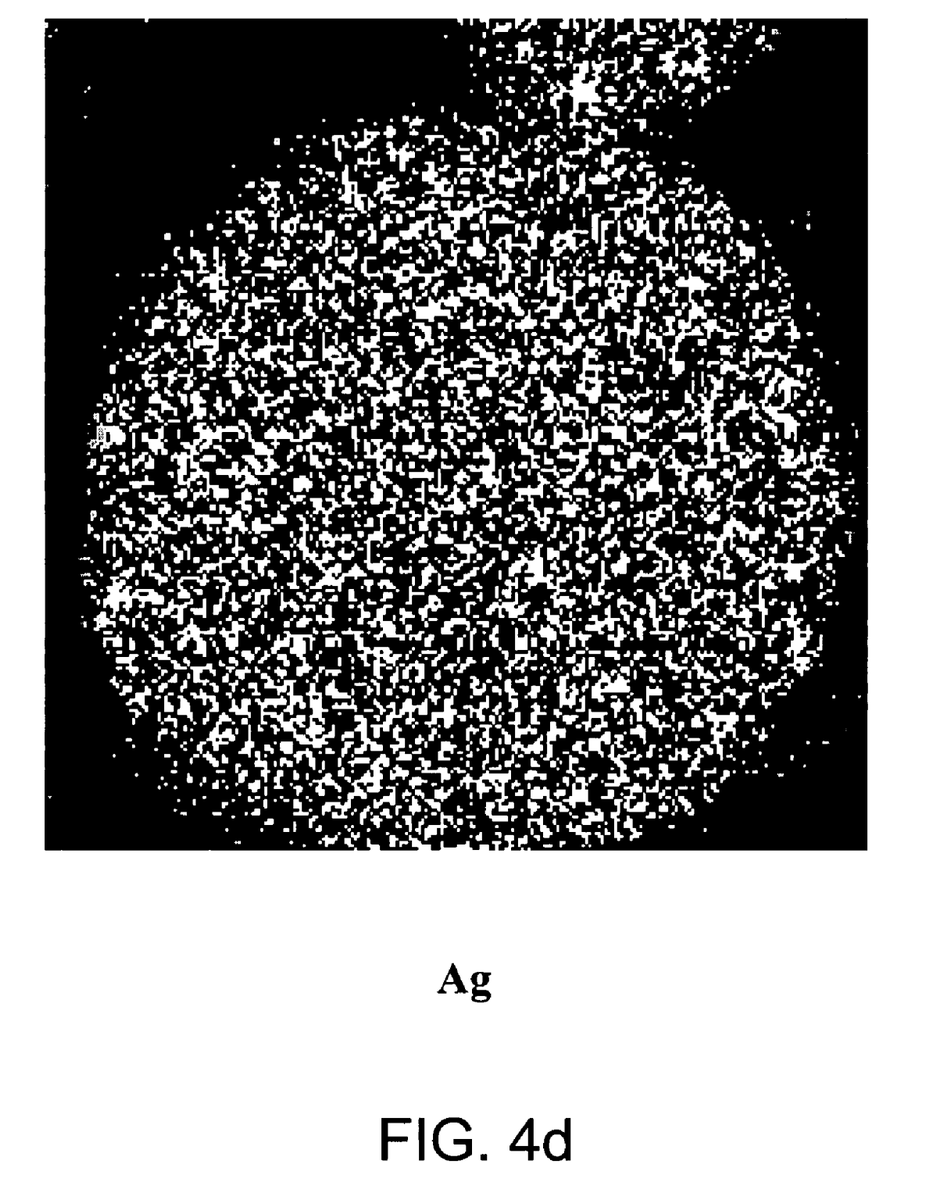
Figure 4E:
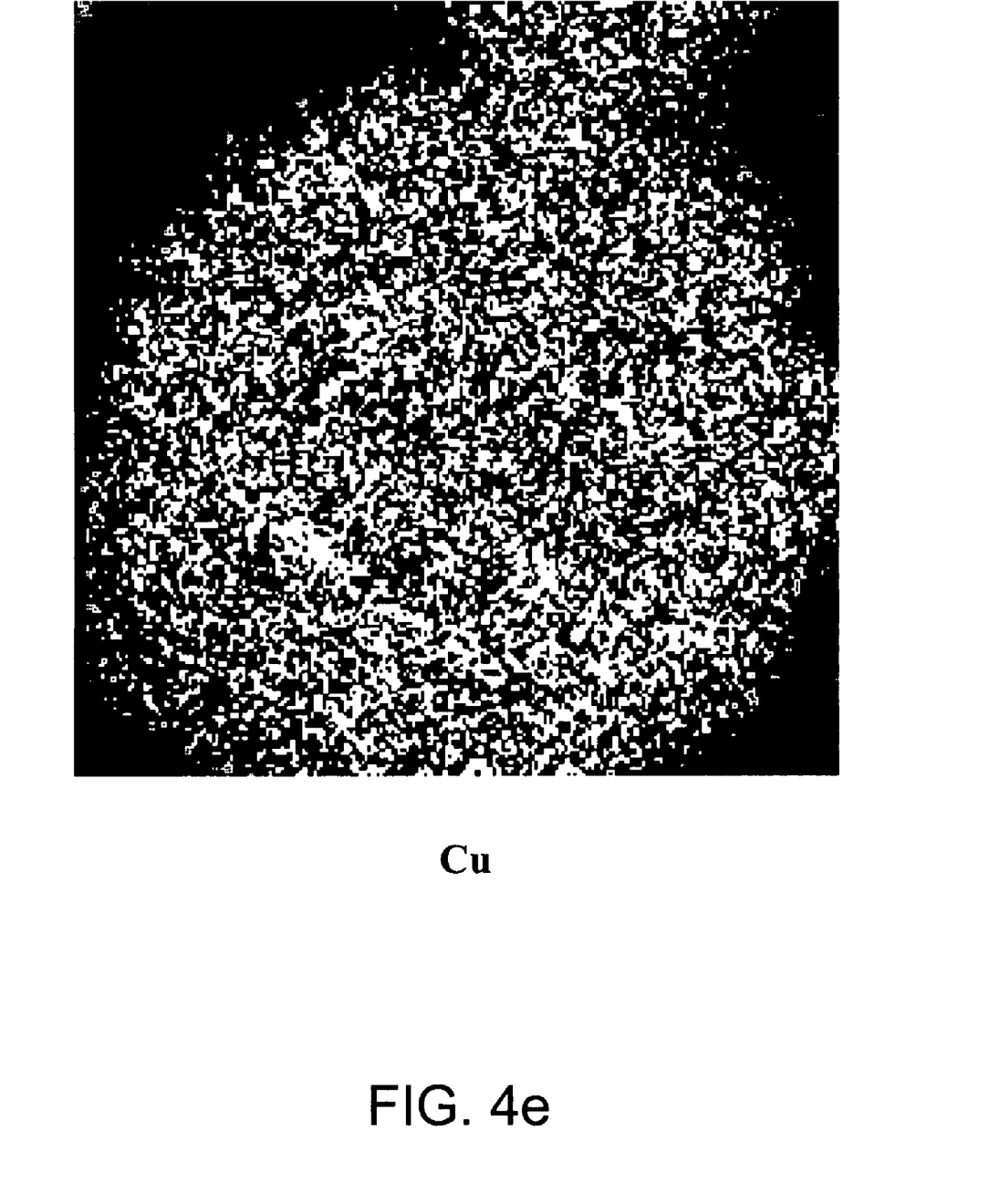
Figure 4F:
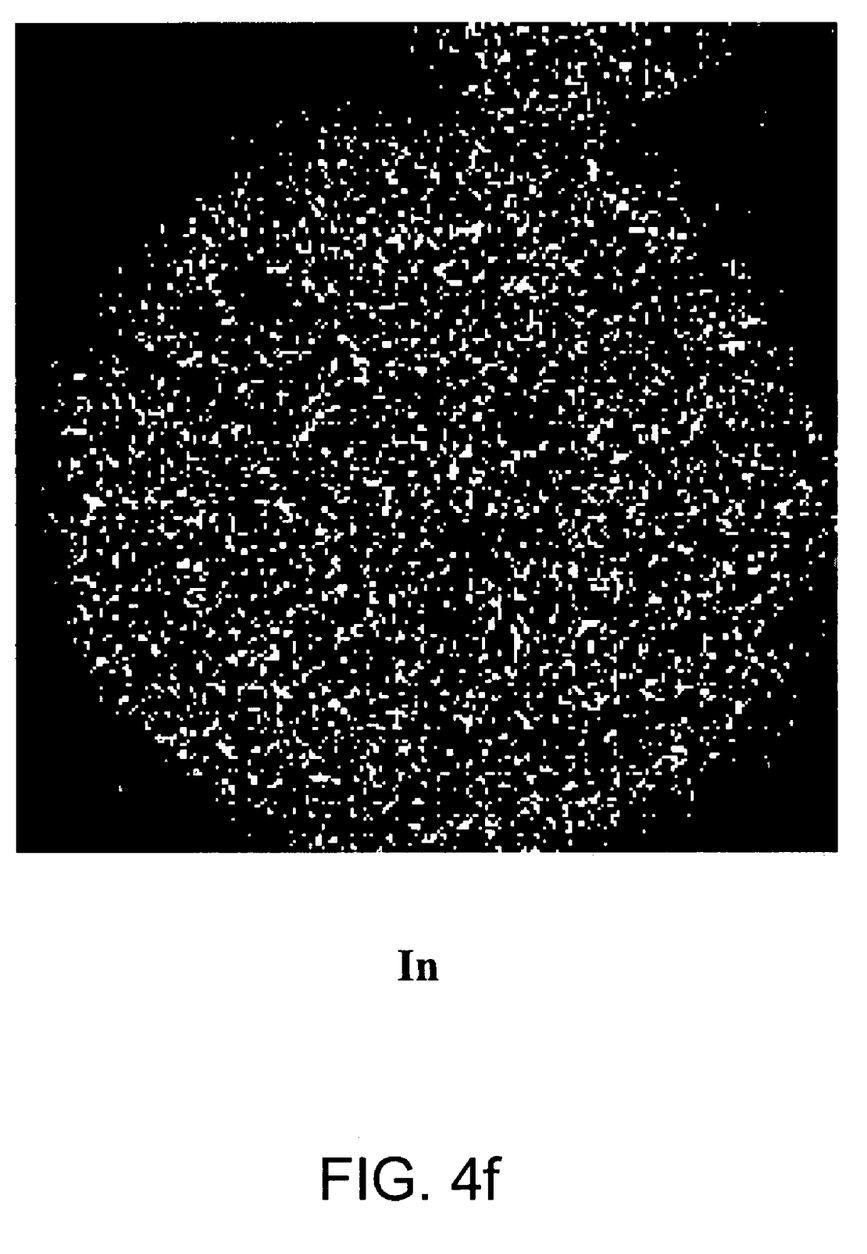

FIG. 4a illustrates the distribution of the neodymium in the matrix of such a solder ball produced in accordance with the inventive method. In FIG. 4a it can be seen that the distribution of the neodymium is regular and uniform. There are no longer any coarse occlusions made of neodymium oxide or slag. Intermetallic phases are smaller and homogeneously distributed. Likewise, all of the other alloying partners are distributed homogeneously in the volume of the ball so that optimum solder properties can be attained.

The invention claimed is:

1. Method for producing fine solder powder from lead-free soft solder alloys, comprising:

melting a lead-free soft solder alloy in an oil in a first container to form a melt, wherein said oil acts as a separating medium to separate said soft solder and reaction products and/or slag by a release of said reaction products and/or slag from said melt into said oil when said soft solder is melted into a melt, and wherein said reaction products and/or slag build up in said oil away from said melt due to differences in density between said melt and said reaction products and/or slag;

separating said oil with said reaction products and/or slag from said melt by transferring said melt to a second container to obtain a transferred melt, said second container having a second oil with a temperature of at least 20° C. greater than a liquidus temperature of said transferred melt;

withdrawing of said oil with said reaction products and/or slag from said first container;

shearing said transferred melt with rotors and stators with a peripheral rotor speed of 15 to 25 m/s while retaining a melt-to-oil volume ratio of 1:20 to 1:50 for forming a dispersion comprising solder balls and said second oil, said shear treatments enlarging a surface area of said transferred melt and driving out reaction products and/or slag from said transferred melt, wherein said reaction products and/or slag build up in said second oil away from said transferred melt due to differences in density between said transferred melt and said reaction products and/or slag and wherein said transferred melt and said second oil are circulated through a shearing device for 10 to 30 minutes for performing said shearing multiple times until the desired diameter distribution of the solder balls is obtained and wherein the shearing causes the alloy partners in the transferred melt to be homogeneously distributed in the transferred melt;

separating the solder from said dispersion by sedimentation; and separating said second oil with said built-up reaction products and/or slag from said solder balls after said solder balls have settled, wherein said solder balls have a diameter of 2.5 to 45 µm.

2. Method in accordance with claim 1, wherein said soft solder alloy substantially comprises Sn, Ag, Cu, In, and a lanthanoid and/or a reaction product of a lanthanoid.

3. Method in accordance with claim 1, wherein said soft solder alloy substantially comprises Sn, Ag, Cu, In, Nd, and reaction products in a form of neodymium oxide and/or $Ag_3Sn$- and $Cu_6Sn_5$-intermetallic phases.

4. Method in accordance with claim 1, wherein said soft solder alloy substantially comprises Sn, Ag, Cu, Ni and $Cu_3Sn$- and/or $Cu_6Sn_5$-intermetallic phases.

5. Method in accordance with claim 1, wherein said soft solder alloy substantially comprises Sn, Ag, and reaction products in a form of $Ag_3Sn$-intermetallic phases.

6. Method in accordance with claim 1, wherein said soft solder alloy substantially comprises Sn, Cu, and reaction products in a form of $Cu_3Sn$- and/or $Cu_6Sn_5$-intermetallic phases.

7. Method in accordance with claim 1, wherein a surface area of said transferred melt is enlarged 2000 to 4000 times by said shearing.

8. Method in accordance with claim 1, wherein said oil and said second oil comprise animal and/or vegetable oil.

9. Method in accordance with claim 1, wherein castor oil is employed as said oil and said second oil.

10. Method according to claim 1, wherein said withdrawing of said oil with said reaction products and/or slag from said first container comprises suctioning.

11. The method according to claim 8, wherein said animal and/or vegetable oil is high-heat resistant.

12. Method according to claim 1, wherein said separating of said second oil with said built-up reaction products and/or slag from said solder balls comprises suctioning.

* * * * *